Aug. 14, 1951 B. B. ELLIOTT ET AL 2,563,926
SOIL ELEVATING AND TREATING MACHINE
Filed Dec. 3, 1945 4 Sheets-Sheet 1
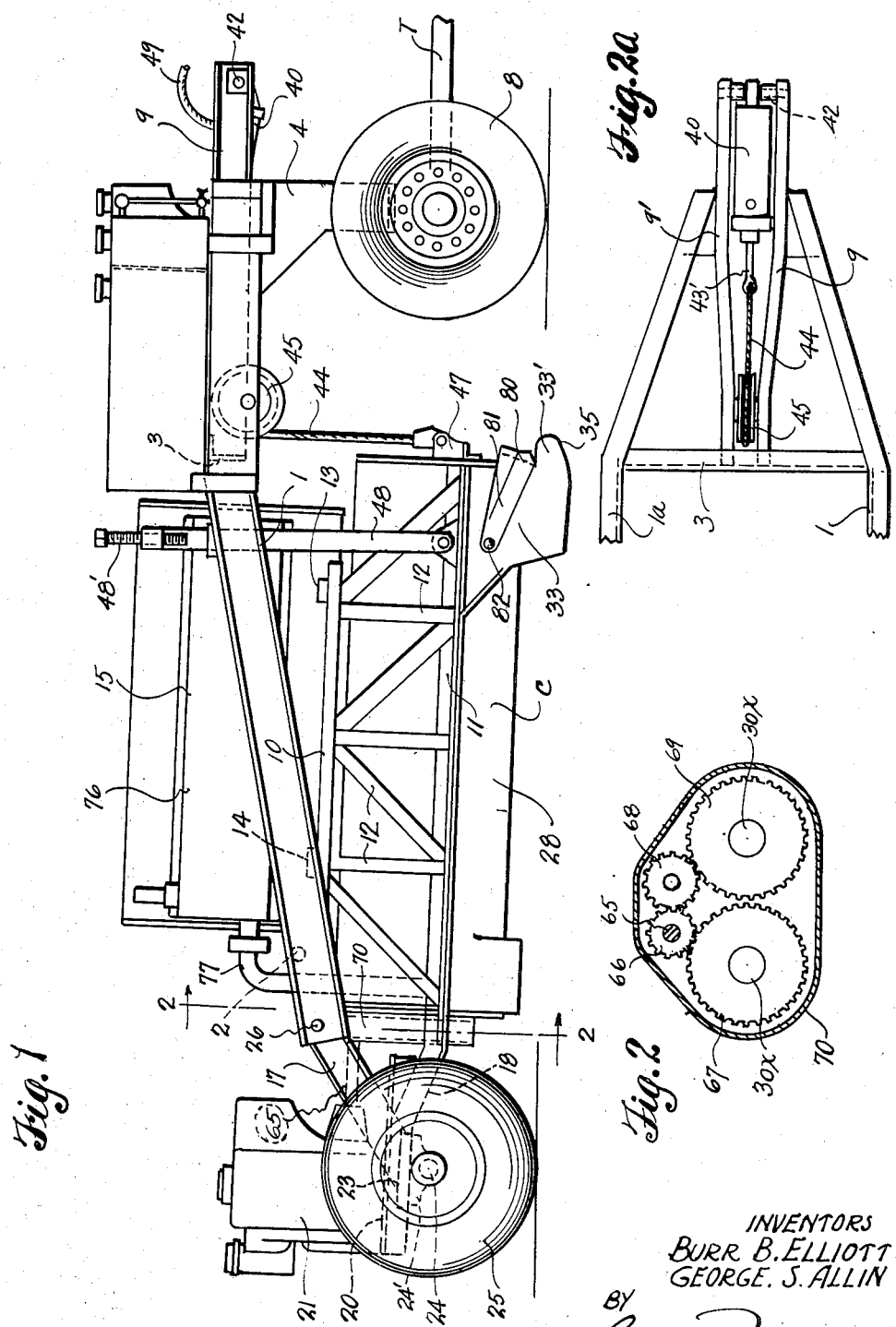
INVENTORS
BURR B. ELLIOTT
GEORGE. S. ALLIN
BY
Cook & Robinson
ATTORNEYS

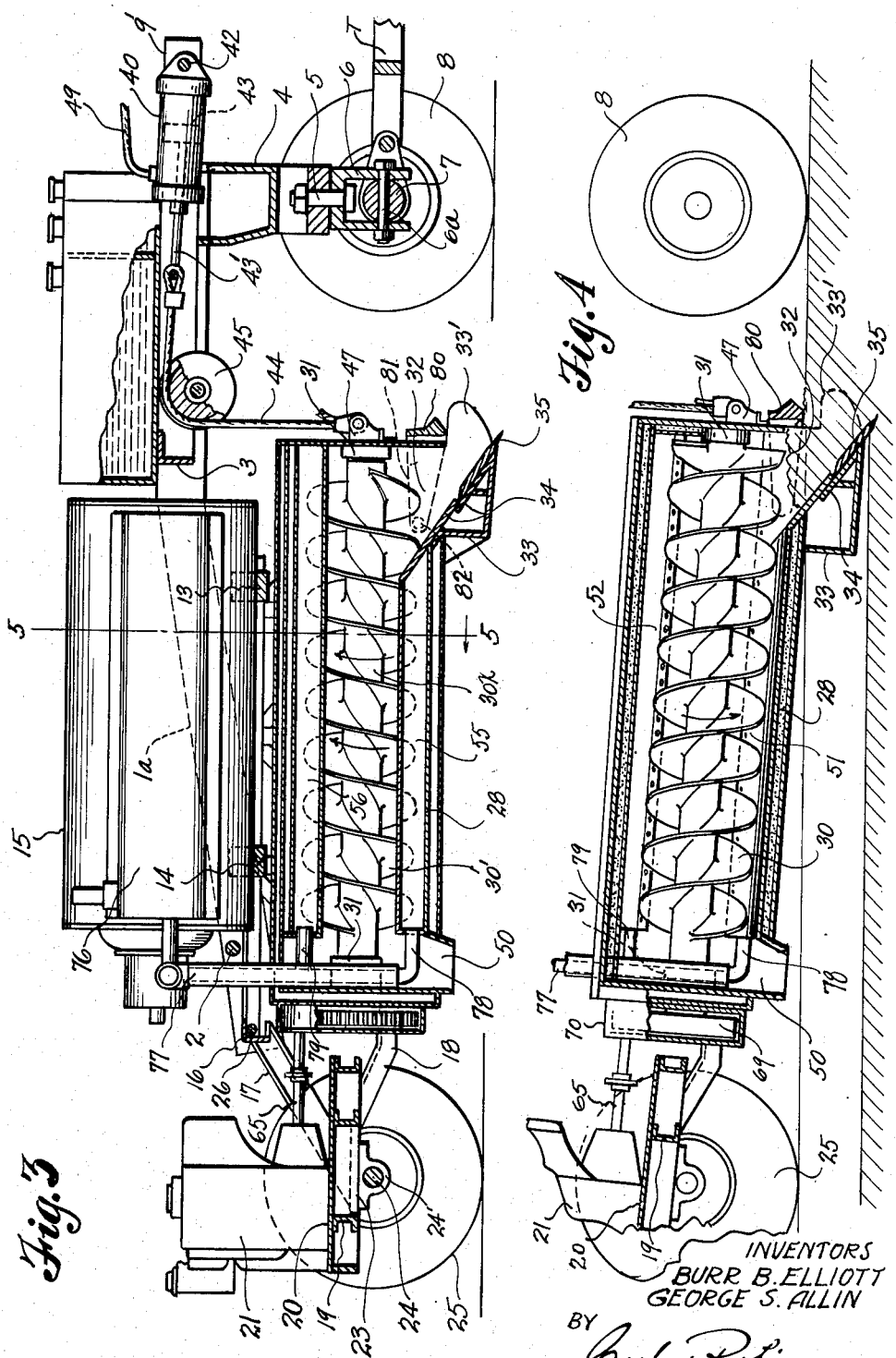

Aug. 14, 1951   B. B. ELLIOTT ET AL   2,563,926
SOIL ELEVATING AND TREATING MACHINE
Filed Dec. 3, 1945   4 Sheets-Sheet 3
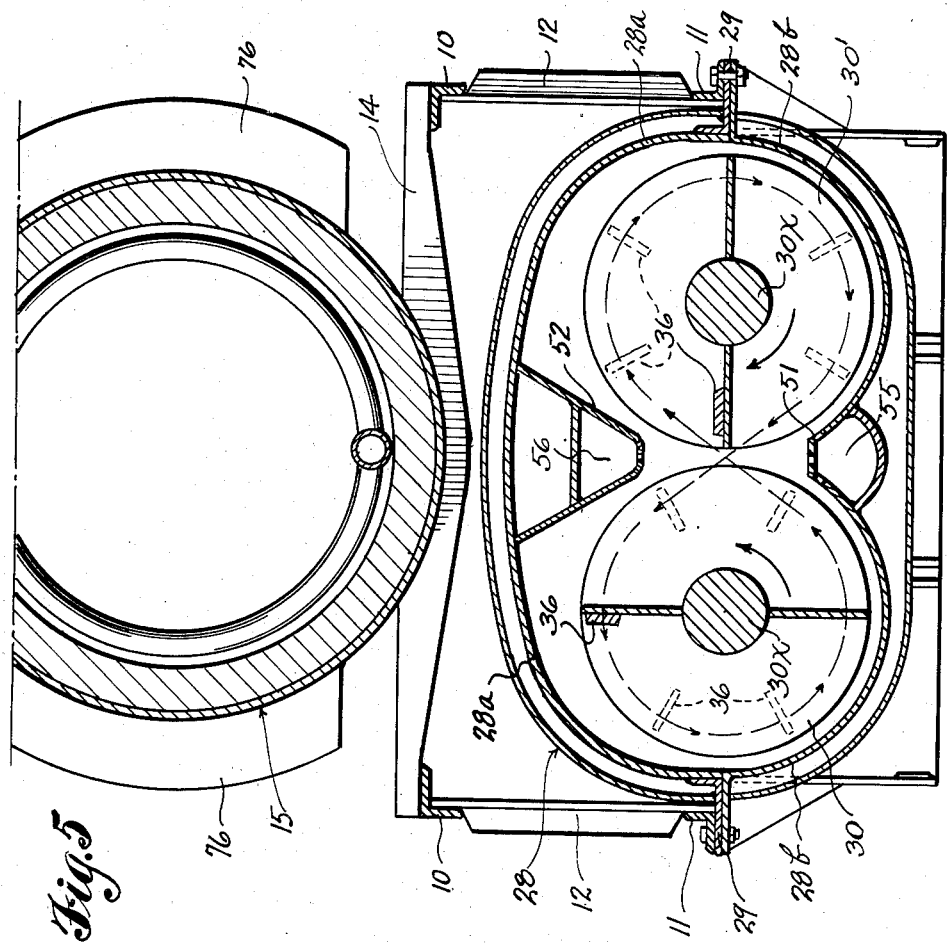
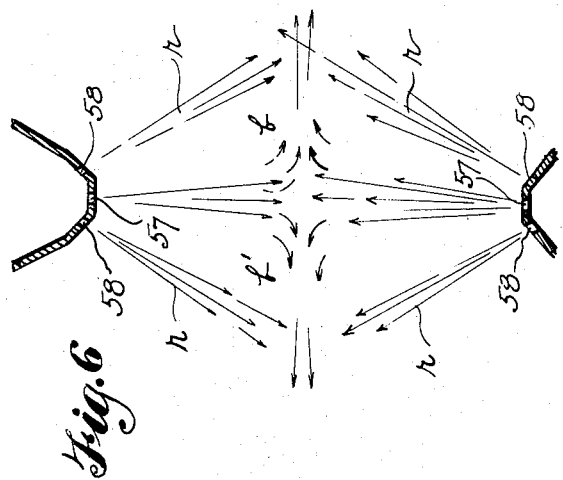
INVENTORS
BURR B. ELLIOTT
GEORGE S. ALLIN
BY
Cook & Robinson
ATTORNEYS

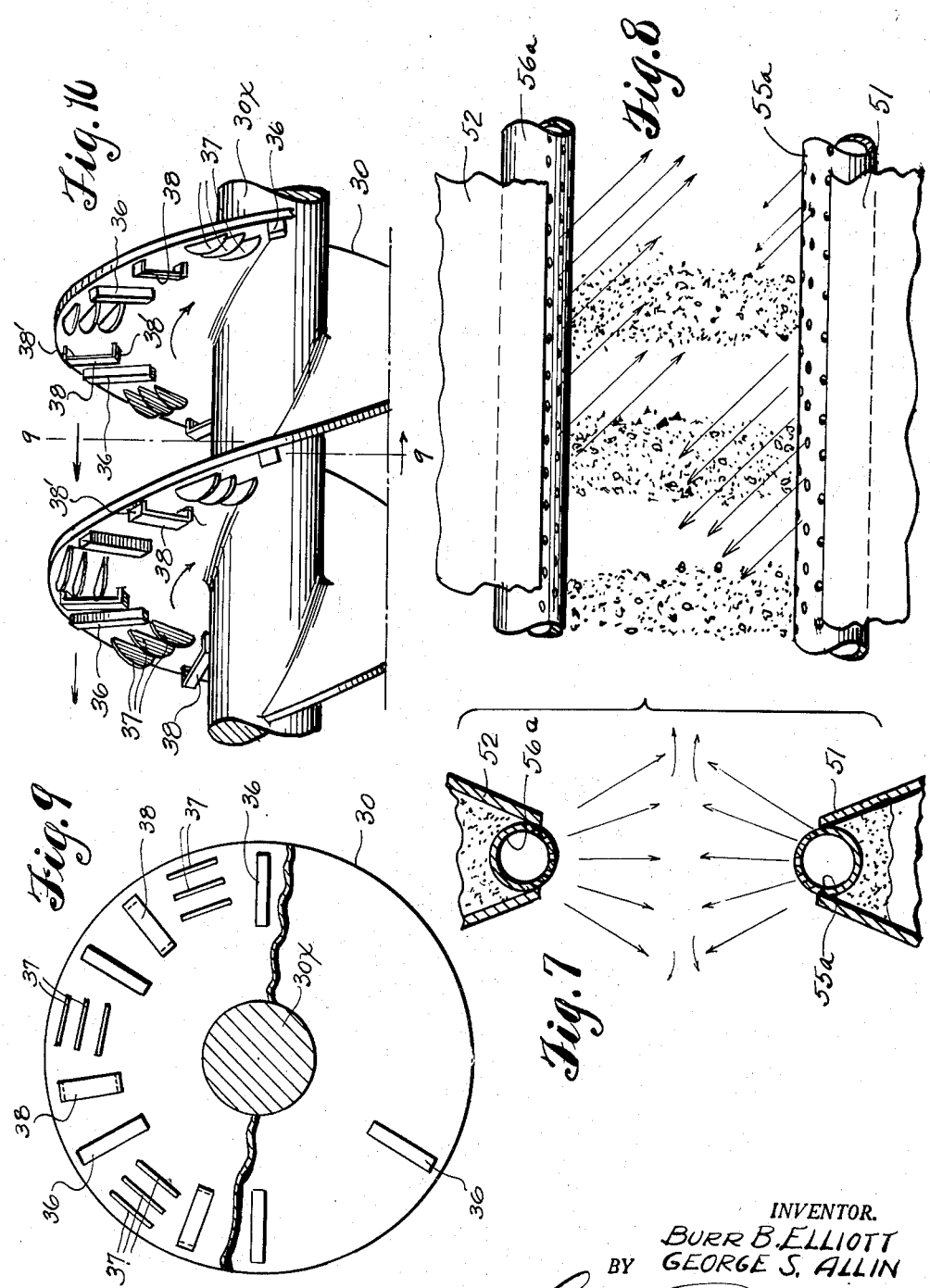

Patented Aug. 14, 1951

2,563,926

UNITED STATES PATENT OFFICE 2,563,926

SOIL ELEVATING AND TREATING MACHINE

Burr B. Elliott and George S. Allin,
Seattle, Wash.

Application December 3, 1945, Serial No. 632,447

11 Claims. (Cl. 97—10)

1

This invention relates to machines and apparatus designed for treating the soil of agricultural lands, for the sterilization and revivification thereof, for the growing of useful crops thereon.

More particularly, the invention relates to machines for treating the soil of agricultural lands in accordance with the methods, teachings and objects set forth in our copending application filed July 27, 1945, under Serial No. 607,450.

The method of treating soil that is disclosed in the copending application above mentioned, contemplates the sterilization and revivification of the soil of arable lands by comminuting or finely dividing it, and then subjecting the soil particles to intimate contact with steam of a high degree of superheat. To best carry on this treatment, it is required that the soil be lifted from the ground and delivered in a comminuted condition through a closed treating chamber into which the superheated steam is admitted for direct and intimate contact with the soil particles.

To carry on the method as above outlined, in a practical and economical manner, it is most desirable that it be done on the spot, and with such rapidity that time and cost of treatment will not nullify the advantages in crop production to be gained thereby.

The reasons for soil sterilization and revivification have been quite exhaustively discussed in our copending application above mentioned and will not be discussed in detail in this specification. However, it will here be explained that the prior art is replete with machines of various kinds for the application of saturated steam into the ground with the idea of killing worms, insects and the eggs, larvae and pupae of soil infesting pests incident to bringing the temperature of the soil to a lethal temperature. Also, there are machines designed to lift a strip of soil from the ground and to pass it through a treating chamber wherein it is subjected to heat of fire, or gases, but neither this type of machine nor those which have injected steam into the ground have proven effective for their intended use nor practical from the standpoint of expense of operation and results attained, and this has been due mainly to the fact that in the case of the first types of machines mentioned, it is economically impractical, if not impossible, to bring the temperature of the soil to that degree of heat required for the effective elimination of soil infesting pests. In the case of the second type of machine mentioned, it has not only proven to be detrimental to the soil itself to subject it to that high degree of flame heat required for pest extermination, but the desired results of soil revivification, obtained by the present method and means of treatment, cannot be brought about in that way.

In view of the foregoing explanatory matter, it has been the principal object of this invention to provide a machine of a practical and suitable kind, whereby the method of treating soil, and the objects of the treatment as disclosed in the

2 above mentioned copending application, may be effectively and economically carried on. Furthermore, this object takes into consideration the application and effects of superheated steam of a high degree of superheat as distinguished from application and effects of saturated steam which contains no heat in excess of the heat of vaporization.

It is also an object of the invention to provide a mobile machine for carrying on the process or method taught in the copending application including, in combination with means for maintaining a supply of superheated steam, a treating chamber that is equipped to receive soil thereinto directly from the ground, in accordance with the advancement of the machine thereover, together with means located inside the chamber for comminuting the soil as it is received and to deliver it in a loose condition of suspension through an area of concentrated superheated steam within the chamber for the intended sterilizing and rejuvenating treatment effected by its intimate momentary contact with the steam of a high degree of superheat.

It is a further object of the invention to provide steam distributing means of novel character within the chamber whereby to maintain an area of concentrated superheated steam through which the particles of comminuted soil may be cast for treatment, and effectively treated without resulting in any detrimental heating of the soil.

It is also an object of this invention to provide means in the treating chamber for the quick and effective comminution of the soil after it enters the chamber, and whereby the comminuted soil will be conveyed in a loose condition of suspension from the receiving to the discharge end of the treating chamber, and, incident to its conveyance, cast back and forth through the area of concentrated superheated steam.

Still another object of the invention is to provide steam supply manifolds within the treating chamber equipped with discharge orifices or jets in a novel arrangement that results in forming an interlaced pattern of superheated steam streams in a concentrated area through which the dirt particles must travel; said streams being so arranged and interlaced that no particle can pass through the area without contacting one or more streams of superheated steam.

Still further objects of the invention are to be found in the details of construction and combination of parts embodied in the machine of preferred form and in the modifications thereof, and in the use and mode of operation of the machines as will hereinafter be fully described.

In accomplishing these and other objects of the invention, we have provided the improved details of construction, the preferred forms of which are illustrated in the accompanying drawings, wherein—

Fig. 1 is a side view of a soil treating machine embodied by the present invention.

Fig. 2 is a cross sectional detail on line 2—2 in Fig. 1, showing the arrangement of driving gears for the screw conveyors.

Fig. 2a is a plan view of the forward end portion of the main frame.

Fig. 3 is a central, longitudinal section of the machine.

Fig. 4 is a detail, in section and in the vertical axial plane of one of the conveyor screws, illustrating the disposition of the forward end portion of the treating chamber and ground contact portion of the blade for the delivery of soil from the ground into the chamber.

Fig. 5 is an enlarged, cross sectional view of the treating chamber and portion of the boiler taken on line 5—5 in Fig. 3.

Fig. 6 is an enlarged cross sectional detail of parts of the steam delivery manifolds in the chamber, showing the pattern formed by the steam jets in defining the concentrated area of superheated steam through which the soil particles are cast.

Fig. 7 is a cross sectional detail of manifolds of alternative form of construction.

Fig. 8 is a side view of parts of the same, indicating the direction of discharge of steam therefrom.

Fig. 9 is a cross sectional detail on line 9—9 in Fig. 10 of a conveyor screw as equipped with clod breaking and tuber cutting blades.

Fig. 10 is a side view of the same.

Before describing the machine in detail, it will be described in a general way in order that a better understanding of the construction, relationship and uses of the parts, when described in detail, may be had. In its present preferred form of construction, as a mobile, soil treating apparatus, the machine comprises a main frame structure and an auxiliary frame pivoted thereto for hinging action about a horizontal, transverse axis. The frames are supported by forward and rearward sets of ground wheels and are drawn by a draft bar or tongue; it being the intent that the machine be tractor drawn, but it is fully anticipated that it might be equipped with an engine for self-propulsion if such should be desired.

Supported upon the main frame is a boiler and accessories for maintaining a supply of superheated steam and supported by the auxiliary frame is an elongated soil treating chamber or tunnel. This is extended horizontally and in the longitudinal direction of the machine and at its forward end has a receiving opening within which a blade is set in such manner that incident to forward advancement of the machine, with the blade in ground contact, a strip of soil will be lifted and delivered across the blade, and through the opening, into the treating chamber.

Located within the treating chamber are two oppositely driven conveyor screws that coact to break up and comminute the soil as it is received and to cast it back and forth across the chamber in a loose condition of suspension, in its progression to the discharge end of the chamber. Also located in the treating chamber are steam delivery manifolds, supplied from the boiler, and from which superheated steam is discharged into the chamber in a novel and specific manner to maintain a concentrated area of superheated steam, and it is through this that the soil particles are cast in their back and forth travel in the chamber under the influence of the conveyor screws.

Devices on the forward section of the frame control the raising and lowering action of the rear section as a means of determining the relationship of blade and ground, thus to determine the depth of the strip of soil to be lifted into the treating chamber as the machine advances.

Referring more in detail to the drawings, and particularly to Figs. 1 and 3:

The main frame structure comprises the coextensive, opposite side beams 1 and 1a which extend substantially in the horizontal direction. The rearward end portions of these two beams are parallel and somewhat downwardly and rearwardly inclined and are rigidly joined in spaced relationship near their rearward ends, by a solid cross shaft 2. At a distance somewhat back of their forward ends, the beams 1 and 1a are rigidly joined by a cross member or bar 3 of angle iron form. This together with bar 2, maintains the spaced, parallel relationship of the downwardly inclined portions.

Forward of the cross member 3, the forward end portions of the beams 1 and 1a converge in the forward direction and at their ends are rigidly and permanently fixed, by welding, or otherwise, to a downwardly extended support or post 4 located in the central longitudinal line of the frame.

At its lower end, the post 4 mounts a vertical pivot pin 5 by which connection is made with an inverted U-shaped bearing yoke 6 which, in turn, has a horizontal, pivot pin 6a therethrough connecting it with a cross axle 7.

The cross axle 7 is equipped at its ends with ground wheels 8—8. Also it has a draft tongue T through which a connection may be made with a tractor or the like, for pulling the machine.

Disposed between the converging forward end portions of beams 1 and 1a, are paired beams 9 and 9' that pass along opposite sides of post 4 and are welded or otherwise fixed thereto. At their rear ends, these beams are welded, in slightly spaced relationship, to the cross beam 3, while their forward end portions extend in parallel, spaced relationship forwardly of the post 4 for a purpose presently to be described.

The auxiliary frame comprises spaced apart opposite side portions of truss-like construction, each having a top chord 10, and a bottom chord 11 joined by vertical and diagonal brace bars 12. The top chords 10 of the opposite side frames are rigidly joined across their forward ends by a cross bar 13, and intermediate their ends by a cross bar 14. The cross bars 13 and 14 in this arrangement are designed as cradles in which the steam generating and superheating boiler, designated in its entirety by reference numeral 15, is supported in a position lengthwise and centrally of the frame.

At the rear end of the frame, the two truss-like portions are joined rigidly across the top by an angle iron bar 16, and from the ends of this, a pair of downwardly and rearwardly directed bars 17 extend and are joined at their lower ends with rearwardly and inwardly converging extension portions 18 of the bottom chords 11 of the truss frames. Between these joined portions of the bars 17 and 18, are cross beams 19 which serve as supports for a horizontal platform 20 on which an engine 21 is mounted for driving the conveyor screws as will presently be described.

The rear end extensions of the truss-like side sections of the auxiliary frame are equipped with pads 23 for their fixed securement to bearings 24' of a cross axle 24 through which the rear end of the machine is supported, and this axle is equipped at its ends with ground wheels 25.

In the assembled and hinged relationship of the main frame and auxiliary frame, the side beams 1 and 1a of the main frame lie in planes parallel to and outside of the truss-like sections of the auxiliary frame, with the rear ends of the beams 1 and 1a overlapping the rear ends of the truss-frames where the frames are joined by the cross beam 16. The hinged connection of the frames is effected by means of a cross shaft 26 that extends pivotally through these overlapped portions of the frames. It is by reason of this hinged connection that relative adjustments may be made for bringing the blade of the treating chamber into and out of ground contact. Also, this connection provides the means of support for the rear end of the forward section and effects an operative connection between the frame sections. This will presently be more fully explained.

It will be observed in Figs. 1 and 3 that the main frame extends beyond the forward end of the auxiliary frame sufficiently for ample wheel clearance in turning.

Supported between the opposite side frames of the auxiliary frame is the steam tunnel or treating chamber, designated in its entirety by reference character c, within which the soil particles are subjected to intimate contact with superheated steam. This chamber comprises an elongated, well insulated tubular housing 28 of sheet metal disposed in a direction lengthwise of the machine and solidly secured in place between the two truss-like side sections of the auxiliary frame by direct connection with their bottom chords 11. It will best be understood by reference to Fig. 5, that this chamber is made up of complemental upper and lower sections 28a and 28b, joined together along opposite sides by flanges 29 which, in turn, are securely bolted to the lower chords of the truss-like sections.

In cross section, the treating chamber is shaped to contain therein two parallel, conveyor screws of substantial diameter and extending substantially the full length of the tunnel. These screws, designated respectively by numerals 30 and 30', are disposed with their axes in the same horizontal plane, and have their mounting shafts 30x rotatably contained in bearings 31 mounted in the opposite end walls of the chamber, as shown in Figs. 3 and 4.

Across its forward end, the chamber is formed with a forwardly and downwardly directed opening 32 and about this opening, a frame or housing 33 is solidly fixed to the chamber. This housing supports therein a forwardly and downwardly inclined wall 34 which, across its lower end, mounts a ground cutting blade 35. The blade is so disposed relative to the opening 32 that on lowering the forward end of the chamber, the cutting edge of the blade may be brought into ground contact and thus cause a strip of earth to be dug up as the vehicle advances, and this strip of soil to be advanced across the blade, up the inclined wall 34 and into the forward end of the treating chamber through the opening 32. Then, upon entering the chamber, the soil is picked up by the rotating conveyor screws 30 and 30' and is delivered rearwardly thereby through the treating chamber, and to the discharge opening at the rear end.

The conveyor screws operate both to convey the soil, and to effect its rapid and complete comminution as required for the most effective treatment. Their direction of rotation is designated by the direction arrows placed thereon in Fig. 5. The means for effecting this rotation is the engine 21 operating through means presently described.

In the present instance, we have found it most desirable to employ right and left hand, double-lead screws that are rotated in opposite directions, and are set one 90° ahead of the other so that in operation, the dirt thrown from either screw through the treating area, will not be thrown directly into dirt from the other and providing that the successive waves of dirt as they progress along the treating area, will pass through the treating area in opposite directions.

The conveyor screws as shown best in Fig. 5, are equipped on the driving surfaces, near the edges, with lugs 36 that are adapted to break up and tear apart the soil clods and sod. These lugs are in the form of bars placed in radial positions and near the outer edges of the screw flanges. Large solid objects will be moved along the bottom of the treating chamber to drop out through the discharge opening without damage to the machine. The broken up soil will be thrown by the oppositely rotating screws in a cross fire action from one side of the tunnel to the other, dirt from the two screws being discharged in advancing waves alternately moving in opposite directions.

In Figs. 9 and 10, we have illustrated the equipping of the conveyor screws with cutters, in addition to the lugs 36 for the purpose of insuring the breaking up of hard clods and the slicing of tubers and roots in order that they will more quickly rot in the ground. The lugs 36 are located at approximately 60° intervals along the driving face of each screw and just forwardly of each of these, a plurality of blades 37 are welded onto the face of the screw. These blades are parallel and spaced in a direction radial of the screw, and each has an arcuate cutting edge extended in the direction of rotation. These blades are intended primarily to cut and break up clods.

Following each lug 36 is a slicing blade 38. This comprises a flat bar, extended in a radial direction and supported by end portions 38' outwardly spaced from the face of the screw; the forward edge of the bar being sharpened for tuber slicing but also effective for breaking up clods.

The use of the bars and blades, and the number required, would be determined by the character of the soil being treated and the vegetation or plant life growing therein. The desirability for the breaking up of clods is to insure that the maximum percentage of soil particles will be effectively treated by the steam and the slicing of tubers and roots is to expedite and insure quick rotting or decomposition in the soil.

The progression of the soil from the receiving end of the chamber to the rear end outlet follows a definite course which is substantially that of a progressively advancing and repeating figure 8, as will be understood by reference to the dotted line of arrows in Fig. 4. This results in the passing of all particles of soil repeatedly from one side of the chamber to the other with an effective mulling and mixing of the soil.

The raising and lowering of the forward end of the treating chamber, whereby to move the blade into and from the ground and to determine and maintain its digging depth, is accomplished by means best shown in Fig. 3, wherein it is shown that a hydraulic jack cylinder 40 is horizontally disposed between the forward end portions of the extension beams 9 and 9'. This cylinder is pivotally mounted at its forward end on a transverse pivot pin 42, passed through its end head and through the beams 9 and 9'. Contained in the cylinder is a piston 43 equipped with piston rod 43' extended rearwardly from the cylinder. Fixed to the rear end of the rod 43' is a cable 44 that passes over a sheave wheel 45 that is supported between the rearward end portions of the brace beams, then downwardly and at its end, is attached to a bracket 47 that is fixed to the forward end wall of the treating chamber.

Hydraulic pressure medium is supplied to the cylinder from a source of supply, not shown, through a flexible tube 49 to control the piston movement, and this movement may be such as to effect the raising and lowering of the forward end of the tunnel as desired or required for digging up a strip of soil to any depth desired within the limits of the machine or to hold the blade clear of the ground for travel of the machine without digging.

It is to be understood that the transverse length of the digging blade determines the width of the strip of ground that will be lifted and that the depth of strip may be varied to a predetermined maximum. Soil that is received into the treating chamber at its forward end is ultimately discharged through the discharge opening 50 that is formed across the bottom of the chamber at the rear end. When discharged, this treated soil falls into the furrow from which it was taken.

In order that any working depth of operation after once being established, might be easily returned to, we provide hanger brackets 48, shown in Fig. 1, vertically fixed to the truss frames at opposite sides of the chamber and extended back of the frame beams 1 and 1a. At their upper ends the hangers 48 have screws 48' adjustably mounted therein and designed to engage against the top sides of the beams 1 and 1a, thus to establish the furrow depth upon lowering the chamber to locate the blade in dirt lifting position.

The design of the chamber, the location, character and action of the screws 30 and 30' on the soil and the place of admittance of superheated steam to the chamber, are of importance. In the cross sectional view of Fig. 5, it is to be noted that the two conveyor screws are horizontally spaced and are quite close together, and that the tunnel walls in extending about the bottom and outer sides of the screws are close to and conform to the curvature of the screws. The space between the side walls and screws is made narrow in order to facilitate the comminuting action on the soil in its travel through the chamber. In this connection, it is to be understood that the capacity of the chamber is ample for all dirt received from the blade and permits a substantial amount of open space between particles of comminuted soil.

The upwardly converging portions of the bottom wall of the chamber merge together to form a central, longitudinal ridge 51, and fixed to the top wall of the chamber, centrally of the chamber and extending to the full length thereof, is a housing 52 that is V-shape in cross section. The ridge 51 and housing 52 extend longitudinally of the chamber and define the bottom and top limits of a somewhat restricted central passage through which the dirt particles are cast or thrown by the conveyor screws from side to side of the chamber, as the dirt progresses in its travel in the chamber, from receiving to discharge ends.

Contained within the longitudinal ridge 51, is a steam delivery manifold 55. Likewise formed in the housing 52 is a steam delivery manifold 56. These manifolds are amply supplied with superheated steam from the boiler 15.

The manifolds 55 and 56 are formed with longitudinal rows of ports in definite locations and direction to define a definite and predetermined steam pattern. By reference to Fig. 5, it is observed that the two manifolds are symmetrically located relative to the horizontal axial plane of the screws. One is directly above the other and each is provided along its center with a row of closely spaced ports 57 from which jets of steam will be discharged directly toward and into those from the other manifold. These jets will oppose each other and the impinging blasts therefrom will result in opposite and directly lateral blasts as indicated at b and b' in Fig. 6. Also, each manifold is formed along opposite side portions with rows of ports or orifices 58 and these are so directed as to cause the steam jets r to be directed at an angle outwardly from the center line of jets. The cross sectional pattern defined by the steam jets from the four rows of ports 58 is that of a diamond and this pattern extends the length of the manifolds.

Thus, there is a definite concentrated area of superheated steam that constituted the treating space, between the manifolds and screws, and the dirt, in being cast back and forth from one side of the chamber to the other by the screws, passes through this area of concentrated steam.

As an alternative detail of construction of steam delivery manifolds, we have shown, in Figs. 7 and 8, that the steam delivery manifolds comprise tubes or pipes 55a and 56a located in the ridge 51 and housing 52 and effectively insulated. Each tube is here shown as formed with five rows of orifices instead of three, but the steam pattern is practically the same as shown in Fig. 6. However, it is advantageous from the standpoint of gaining effectiveness of the steam treatment, particularly where a large amount of dirt is being moved through the chamber, to so form the orifices that the steam jets will be inclined in the direction of dirt movement, as indicated by the arrows in Fig. 8. Then the jets of steam have a sweeping action along and through the spaced waves of dirt as they move rearwardly in succession along the treating area and a more effective treatment with better insurance of killing all crop pest organisms.

The two conveyor screws turn at high rate in opposite directions, as indicated by the direction arrows placed thereon in Fig. 5. In operation their top edges travel outwardly, and their lower portions travel toward each other. This direction of rotation, in consideration of the fact that the screws are of opposite pitch, and the pitch is in such direction as to move the dirt toward the rear of the tunnel, will cause the dirt that is dug up and advanced up the inclined plate into the tunnel, to be picked up, finely pulverized and the particles thrown back and forth across the tunnel.

The comminution of the soil releases from the particles, or at least exposes the crop pest organisms, such as eggs, larvae, pupae, insects, seeds and roots of weeds and grasses so that they may be directly contacted by the superheated steam and heat liberated thereto from the steam.

In the present instance, the time of exposure of the soil particles and released organisms to concentrated steam, is from two to three seconds, and this has proven adequate for the effect desired.

The driving of the two conveyor screws is here accomplished by means of the engine 21 mounted on the platform 20. The engine shaft has a driving connection, indicated at 65, with a small gear wheel 66 which, in turn, is in driving mesh with a larger gear wheel 67 fixed to the drive shaft of screw 30' and the other screw is driven in an opposite direction and at the same speed through the mediacy of a gear wheel 68 that meshes with the driven gear wheel 66 and with a larger gear wheel 69 that is fixed on the drive shaft of the other screw. These gears are enclosed in a housing 70, as noted in Fig. 2. In a machine now designed for use, the chamber is eight feet long, the conveyor screws are 24 inches in diameter and have twenty inch pitch. The peripheral speed of rotation is approximately fourteen feet per second.

In the use of this machine, the boiler, designated in its entirety by numeral 15, is equipped with superheaters indicated at 76. From the superheaters, a pipe 77 leads to the rear end of the treating chamber and there has pipe connections 78 and 79 with the manifolds 55 and 56. Suitable burners, not herein shown, supply heat to the boiler for the generation and superheating of the steam. For best results, the steam should be at a temperature of 500° F. or above. The superheated steam is admitted from the manifolds into the treating chamber at approximately two pounds gauge pressure.

At the forward end of the tunnel, a transverse apron 80 is pivotally attached to the tunnel by arms 81 at its ends secured by pivots 82. The apron operates as a sled runner that rides up and down, in contact with the ground just forward of the tunnel, thus to automatically retain the inlet to the tunnel closed against intake of air into the treating chamber. The downward swing of this apron is limited by forward extending toes 33' at the sides of the housing 33 with which the apron may contact.

It will be understood that with the particles of dirt being thrown by the conveyor screws in a cross fire manner from one side of the tunnel to the other, they will be cast directly through the superheated steam in that diamond shaped concentrated area. Each soil particle will be brought intimately into contact with the steam blasts each time it passes from one side to the other and will be effectively treated. The effect of the comminuting of the soil by the action of the screws and the steam treatment is first to get the soil into sufficiently small particles that when they are impinged by the jets of superheated steam in passing through the diamond shaped pattern, the resultant instant transfer of heat units from the steam to the colloidal substances will cause expansion and disruption of the formation and an incidental condensation of the steam on the particles.

Condensation causes heat transfer that breaks down the ionic block and allows more and different water to mix with the jels and sols in the particle and the plant food thus to be released to the soil for use by the plants which are to be grown therein. Also this heat transfer greatly increases chemical reactions for a short period of time. In many cases these reactions will double in speed for each 10° rise in temperature. Also, by the comminuting of the soil, the pest life and weed seeds therein are exposed or separated from the soil and may be killed by the heat transferred thereto by the condensation of steam thereon.

Furthermore, the outer cell structure of roots, weeds and green manures, is broken down so that decomposition is unbelievably accelerated.

Although the preferred embodiment of our invention treats the soil by superheated steam it is to be understood, as is readily apparent, that the machine herein disclosed is equally well adapted to treat soil with various fluids and substances other than superheated steam. For instance, various insecticides such as solutions of DDT and the like may be atomized by discharge at high pressure from the orifices 57 and 58 of the manifolds 55 and 56 and comminuted soil effectively treated as it is being passed through the machine by the helical conveyors 30 and 30'. Power insecticides may also be introduced to the soil in like manner.

Having thus described our invention, what we claim as new therein and desire to secure by Letters Patent is:

1. A soil treating machine of the character described comprising a mobile vehicle, a treating chamber of tunnel-like character mounted therein, and having a receiving opening at its forward end and a discharge opening at its rearward end, soil engaging means at the forward end of the chamber for lifting and guiding a strip of soil into the chamber through the said receiving opening in accordance with advancement of the machine, a source of supply of superheated steam on the vehicle, a steam delivery manifold in the chamber having connection with the said source of supply and having orifices through which steam is discharged into the chamber in a continuous supply to establish an area of high concentration within the chamber and to its full length, and conveyor means in the chamber whereby the soil received is caused to be advanced in a loose condition of suspension through the said area of high concentration; said treating chamber being mounted in the frame for vertical adjustment relative to the ground at its forward end to cause said soil engaging means to engage or disengage the ground and to determine the working depth of said means.

2. A machine as recited in claim 1 wherein the treating chamber is pivotally supported at its rearward end in the frame, and is adjustably suspended in the frame at its forward end by means by which the chamber may be raised or lowered to determine the working depth of the said ground lifting means and to disengage it from the ground.

3. A mobile soil treating machine comprising a wheel supported frame, a treating chamber of tunnel-like form supported in the frame lengthwise thereof, said chamber having a receiving opening across the front end portion thereof and a discharge opening across the rear end portion thereof, a ground lifting blade fixed in the receiving opening, means in the frame pivotally supporting the chamber at its rearward end at a fixed elevation, means in the frame adjustably suspending the chamber at its forward end and operable to raise and lower the chamber to engage or disengage the blade from the ground, a source of supply of superheated steam on the frame, a steam delivery manifold in the chamber, supplied from said source of supply and adapted to discharge steam in an area of concentration in the chamber, lengthwise thereof and extending substantially to its full length, conveyor means in the chamber operable to advance the soil in a loose condition of suspension from the receiving opening to the discharge opening and to pass it through the area of concentration for intimate contact of superheated steam and soil particles.

4. A machine as recited in claim 3 including also a hinged closure member for the forward opening equipped with a runner and adapted to be moved by the runner from closed to open position by ground engagement upon lowering the chamber to bring the blade into ground contact position.

5. In a soil treating machine of the character described, a tunnel-like treating chamber having an opening across one end thereof for the passage into the chamber of soil to be treated and having a discharge opening for the treated soil at its other end, a steam delivery manifold disposed centrally and lengthwise of the tunnel-like chamber, a pair of conveyor screws located in the chamber parallel to and along opposite sides of the manifold; said manifold being adapted to receive superheated steam from a source of supply and having orifices therealong for the discharge of said steam in a highly concentrated amount in the space between conveyor screws, and means for driving said screws to advance soil received through the receiving opening, to the discharge opening and incident to advancement to effect its comminution and, by the coaction of the screws, to cast it back and forth through the area of concentrated superheated steam between the screws.

6. A soil treating machine of the character described comprising a tunnel-like treating chamber having an opening across one end thereof for the reception of soil to be treated and having a discharge opening at its other end for the discharge of treated soil; a pair of parallel coacting conveyor screws lengthwise of the chamber for the conveyance of soil received through the receiving opening to the discharge opening, steam delivery manifolds lengthwise of the chamber along top and bottom walls and between the conveyor screws, defining a passage between them, and means for supplying superheated steam to the manifolds; said manifolds having orifices therealong through which steam may be discharged into the said passage in concentrated amount, and said screws being operable to effect the comminution of the soil in its advancement and the back and forth discharge of the comminuted soil through said concentrated steam, in the progressions of the soil to the discharge opening.

7. In a soil treating machine, a treating chamber, spaced apart steam delivery manifolds in the chamber, adapted to be supplied with superheated steam and each having orifices arranged therealong for the discharge of the superheated steam therefrom in direct opposition to steam discharged from the other manifold to establish an area of high concentration between the manifolds, and means in the chamber for the back and forth casting of soil through the area of high concentration for the intimate contact of soil particles and steam.

8. In a soil treating machine, a tunnel-like treating chamber, a pair of coextensive, parallel and oppositely pitched conveyor screws extending lengthwise within the chamber, along opposite sides thereof, a pair of coextensive steam delivery manifolds, along top and bottom walls of the chamber between the conveyor screws and defining a passage between them; each of said manifolds having rows of steam discharge orifices therein with those of one manifold directed toward those of the other manifold to establish an area of high concentration in said passage, and means for rotating the conveyor screws in opposite directions for comminution and the advancement of soil along the chamber with an incident back and forth casting of the soil in a loose condition of suspension through the area of high concentration.

9. A soil treating machine of the character described comprising a main frame and an auxiliary frame, said auxiliary frame being supported by ground wheels at its rearward end, and said main frame being supported by ground wheels at its forward end and by a transverse hinge connection at its rear end with the auxiliary frame intermediate its ends, a soil treating chamber of tunnel-like form mounted in the auxiliary frame lengthwise thereof and having a receiving opening at its forward end and a discharge opening at its rear end, a blade fixed in the said receiving opening for the lifting and delivery of soil into the treating chamber, means on the main frame for supporting the forward end of the auxiliary frame and for adjusting it vertically to cause said blade to be moved from and into ground contact, and means in the chamber for the advancement of soil therethrough.

10. A soil treating machine as in claim 9 including also a source of supply of superheated steam, steam delivery manifolds in the chamber, means for delivering steam from said source of supply to said manifolds and said manifolds having orifices for the discharge of said steam into a concentrated area in the chamber through which the soil is advanced in its passage through the chamber.

11. A soil treating machine comprising a wheeled vehicle, an elongated chamber disposed lengthwise on said vehicle, said chamber having a soil receiving opening adjacent its forward end, a blade mounted adjacent said opening for slicing a layer of soil from the surface of the earth as the vehicle is moved thereover, said blade being adapted to direct such layer of soil into said chamber, a pair of substantially parallel, horizontally spaced, oppositely pitched, helical conveyors journaled for rotation within said chamber, means rotating said conveyors in opposite directions for pulverizing and advancing the soil rearwardly through said chamber, said chamber having a soil discharge opening adjacent the rear end thereof and means for lowering and raising said blade whereby said blade is engaged and disengaged from the soil.

BURR B. ELLIOTT.
GEORGE S. ALLIN.

REFERENCES CITED

The following references are of record in the file of this patent:

UNITED STATES PATENTS

| Number | Name | Date |
|---|---|---|
| 324,159 | Pfeil | Aug. 11, 1885 |
| 1,002,276 | Johnson | Sept. 5, 1911 |
| 1,303,150 | August | May 6, 1919 |
| 1,677,912 | Bartleson | July 24, 1928 |
| 2,272,190 | Elliott | Feb. 10, 1942 |

FOREIGN PATENTS

| Number | Country | Date |
|---|---|---|
| 437,421 | Great Britain | Oct. 29, 1935 |